L. C. CUMMINGS.

NON-SKID TIRE PROTECTOR.

APPLICATION FILED MAY 14, 1919.

Reissued July 29, 1919. 14,696.

Inventor

Lincoln C. Cummings

By Joseph P. Livermore

Attorney

UNITED STATES PATENT OFFICE.

LINCOLN C. CUMMINGS, OF BROOKLINE, MASSACHUSETTS.

NON-SKID TIRE-PROTECTOR.

14,696. Specification of Reissued Letters Patent. Reissued July 29, 1919.

Original No. 1,285,634, dated November 26, 1918, Serial No. 223,411, filed March 19, 1918. Application for reissue filed May 14, 1919. Serial No. 297,017½.

*To all whom it may concern:*

Be it known that I, LINCOLN CLIFFORD CUMMINGS, a citizen of the United States, residing at Brookline, in the county of Norfolk and State of Massachusetts, have invented certain new and useful Improvements in Non-Skid Tire-Protectors; and I do hereby declare the following to be a full, clear, and exact description of the invention, such as will enable others skilled in the art to which it appertains to make and use the same.

The present invention relates to an improvement in non-skid tire protectors. The object of the invention is to improve non-skid tire-protecting devices which have heretofore been in use in connection with the tires for automobiles, in order to increase the protection afforded the tire and the non-skid qualities of the device. To the above ends the present invention consists in the improvement in non-skid tire protectors hereinafter described and particularly defined in the claims.

Figure 1:
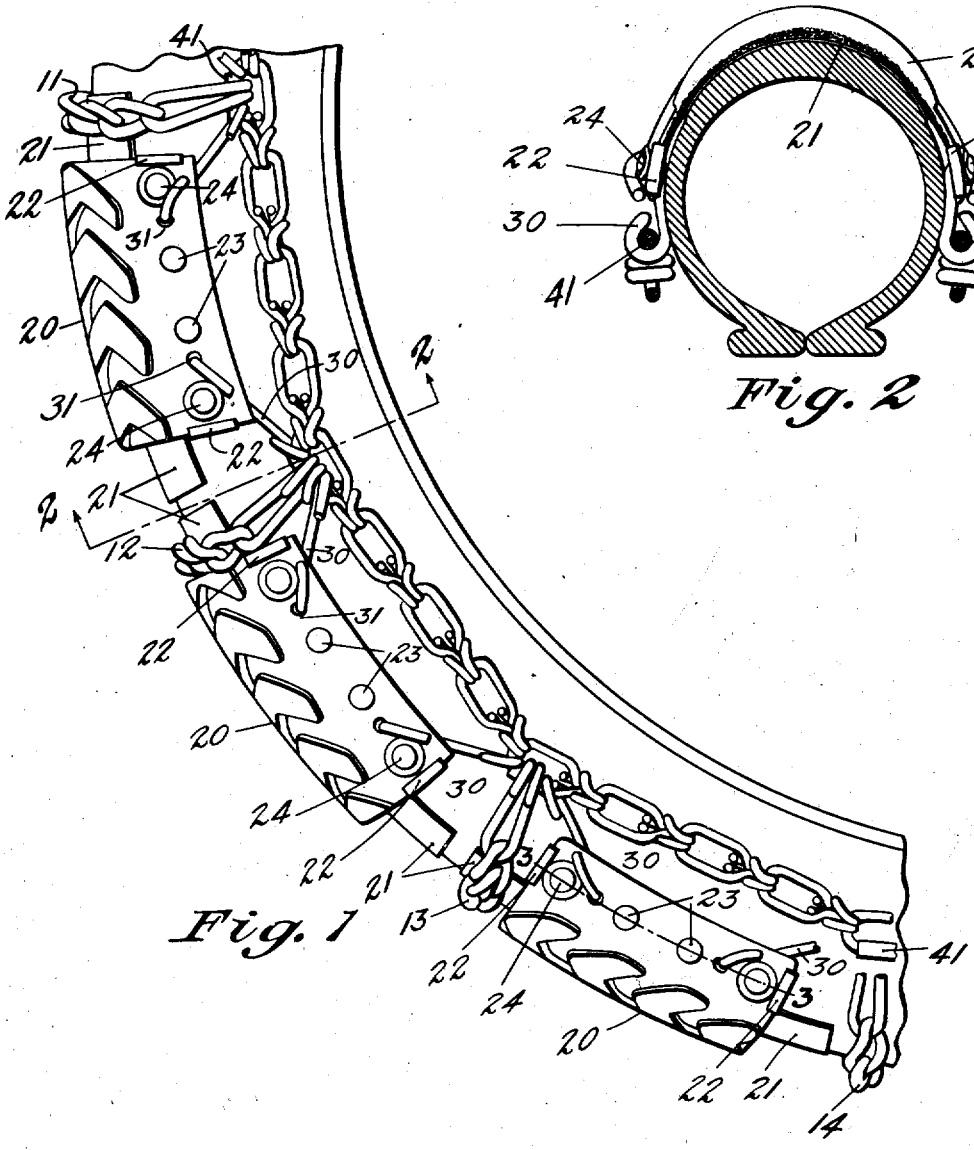
Figure 2:
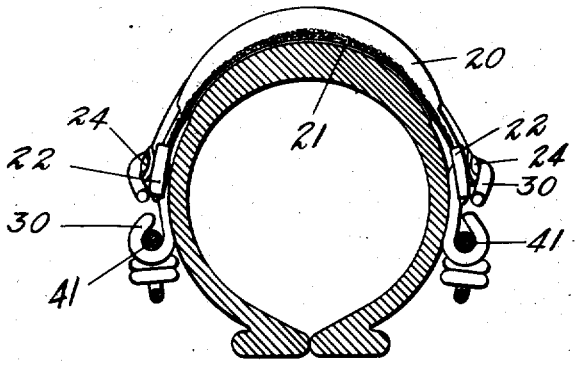
Figure 3:
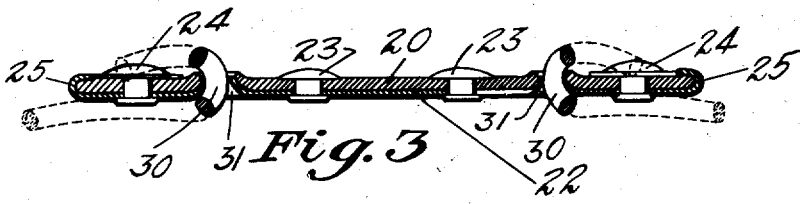

In the accompanying drawings illustrating the preferred form of the invention Figure 1 is a side elevation of a portion of a wheel rim and tire provided with the improved non-skid tire protector of the present invention, showing the left-hand lower portion of a rim of a wheel turning toward the right, that is, a wheel rolling to the right of the position shown in the illustration; Fig. 2 is a sectional view of the tire showing the device in position; and Fig. 3 is a section taken on the line 3—3, Fig. 1.

The illustrated embodiment of the invention is described as follows:—The side chains 10 and cross chains 11 are or may be, except as hereinafter pointed out, the same in construction and arrangement as the well known Weed chain.

Between the successive cross chains 11, 12, 13 and 14 are mounted a series of treads 20. These treads 20 may conveniently be made from a section of a tread of a tire, (such as is adapted to be applied to a shoe in the process of manufacture). It consists of a layer of fabric having a rubber tread portion of usual form on one side. The fabric portion of the tread is extended at 21 at each end of the tread beyond the tread end for the purpose of affording a further protection to the tire from the wear of the cross chain. Each margin or side edge of each tread is provided with a metallic reinforcement strip 22 which is riveted fast to the edge of the tread by rivets 23 and 24, there being two rivets 23 in the central part and two rivets 24 one at each end of the reinforcement strip 22, the rivets 24 being provided with washers under their heads to afford a more secure union between the rivets and the fabric of the tread. The ends of the reinforcement strips 22 are turned up and folded over the ends of the tread, as shown at 25 in Fig. 3, for the purpose of securing a firm connection between the reinforcements and the tread. The treads are secured to the side chains by means of hooks 30, each tread being attached by means of four such hooks which engage holes in the treads and hook into links in the side chains, as shown in Fig. 1. The hooks 30 by which the treads are secured to the side chains are passed through holes 31 in the tread, the hole being countersunk, as shown in Fig. 3, so that the portions of the reinforcement strip 22 which project into the holes 31 provide a reinforcement for the hole and thereby reduce the wear between the hooks 30 and the tread 20. It will be noted that these holes 31 are located between the end rivets and another rivet, that is to say, they are located inside of the end rivet, so as thereby to secure an adequate hold on the tread, so that they will be able to transmit heavy strains without danger of injury to the tread or the hook, and afford a durable connection. Two hooks 30 and the hook of a cross chain all three enter and are attached to a single link in the side chain, as shown in Fig. 1, and the length of the hook 30 and the size of the treads are such that the strains exerted on the side chain by the treads and their hooks is such as to permit the cross chains to be supported loosely in position so that they may move freely on the tire as the wheel rolls along the ground. It is not to be understood that the treads are under so great a strain as to prevent the creeping of the treads on the surface of the tire, but only sufficient to permit the cross chains to be considerably looser than the tread and incidentally so that the treads may creep as is necessarily required of any device adapted to be attached to the tread of an automobile tire. While this creeping is not extensive, it is sufficient to enable the treads to clear themselves of any accidental inclusion of material between the treads and the tires, which, unless cleared and removed from time to time, would cause injury to the tread surface of the tire. The end hook and the cross chain hook cause, of course, some wear on the particular side chain link in which they are engaged, and in order to reduce this wear and thereby prolong the life of the chain, it is desirable, in some circumstances, to provide the side bar of the side chain link which the hook engages, with a roller shell, shown at 41, Figs. 1 and 2. This shell 41 causes the wear on the hook and the wear on the side chain to be considerably diminished as the increased area of contact reduces the rate at which the wear cuts the hook and link.

It is to be observed that the hooks 30 support the sides of the treads out of contact with the surface of the tire. This is of advantage because it prevents the chafing which would otherwise occur between the edges of the treads, particularly the reinforcement strips 22, and the surface of the tire, and because, in addition, it permits the radiation of heat from the tire without the serious impedance which the additional layer of material thereon would offer. It also allows the treads to clear themselves of materials accidentally caught under them, such as fragments of road surface or the like.

It is to be noted that the connection 30 by means of which the treads are attached to the side chains are articulated or hinged to the treads so that there may be relative movement of the treads with relation to the links by which they are attached to the side chains. This contributes to the movement of the side chains with relation to the treads and to the movement of the treads with relation to the side chains without distortion of any member or lifting of the treads from the surface of the tire.

It has been found by actual practice that the use of the traction treads increases the tractive effect of the cross chains. While this seems somewhat paradoxical, extensive use has confirmed the conclusion. It may perhaps be explained upon the theory that owing to the fact that the general level of the road-engaging surface of the wheel provided with this device is somewhat higher than the general level without these treads, the pressure upon the cross chains is somewhat diminished by reason of the use of the treads, as a consequence of which there is a securer connection provided between the wheel and the ground because there is less liability of rolling the cross chains under the wheel.

One of the features of the construction is the very much improved riding qualities of a car provided with this non-skid traction device, because the wheels do not have to ride up over the cross chains as in the ordinary practice, as a result of which the vibrations imparted to the car by the chains are very much reduced in amplitude, and ease of riding is contributed to. It not only contributes to comfort in riding, but it also contributes to the life and durability of the car because it reduces one of the most powerful sources of deterioration, namely, vibration.

Another feature which contributes to increase the traction between wheels provided with this device and the ground resides in the fact that the ends of the treads afford tractive-engaging surfaces which indent themselves into the surface of the ground and thereby contribute to the propulsion of the vehicle by the engagement of these shoulders with the surface of the ground.

Another feature which is of some importance in this connection resides in the fact that whereas in a chain traction device unprovided with these treads, when the car gets to moving laterally of the rear wheels as in side slipping, the cross chains seem to act as runners, thereby tending to induce rather than to prevent the sidewise progression of the wheels. This is particularly true of icy conditions, and conditions in which a hard pavement is covered with a slimy coating acting as a lubricant. In the present construction where the treads engage the surface of the ground or ice upon which the car is moving, the cross chains are deprived of the quality of runners, and it may be said, therefore, that the use of the treads prevents the cross chains from acting as runners and thereby conduces to the prevention of side slipping of the wheels. It is a fact, furthermore, that the cross chains of the device of the present invention are much more durable than in the ordinary cross chains in usual use, and because they are subjected to less pressure and less severe blows than is the usual case. One of the important features of this invention resides in the fact that this device is adapted to vastly prolong the life of the tire and at an expense very moderate in comparison with the tire cost. Not only does it act to prolong the life of the tire by reducing the wear upon the surface thereof, but it also acts as a further protection to the tire against puncture by reason of the increase in the thickness of the material interposed between the inner tube and the road surface. The projecting ends 21 of the treads further act to increase the life of the tire by affording a surface upon which the cross chains may bear, and thereby relieve the tire more or less from the cross-chain abrasion.

In conditions of good road surface, the cross chains may be removed and the device used without them. Under such circumstances the treads act as tire protectors by decreasing the tire wear and liability of puncture. In this connection it should be observed that this tire protector, by reason of the discontinuous nature of the tread surface thereof, owing to the spaces between the successive treads, is a peculiarly valuable contrivance because it allows the radiation of heat from the tire and prevents undue overheating, and at the same time it permits the creeping of the treads upon the tires so that there is no undue wear in any one part of the tire, the openings between the treads permitting radiation of heat from the tire to the atmosphere during the time the portions of the tire are thus uncovered. But a further feature of the present invention resides in the fact that the device constitutes a combination of treads and traction chains whereby the treads are secured in position so as to creep upon the surface of the tire, as the cross chains (more loosely held thereon than the treads) are allowed to operate in the usual manner without an interference with their proper functionation.

Having thus described the invention, what is claimed is:—

1. A non-skid tire protector having, in combination side chains, cross chains and treads between the cross chains, the treads being held on the tire with greater pressure than the cross chains.

2. A non-skid tire protector having, in combination, side chains, cross chains, traction treads located between the cross chains, being less in thickness than the thickness of the cross chains, and means for securing the treads to the side chains.

3. A non-skid tire protector having in combination, side chains, and treads composed of yielding flexible material, and connections extending one from each corner of each of the treads to the side chains, said treads being held upon the tire with spaces intervening between their adjacent ends and being capable of creeping on the tire.

4. A non-skid tire protector having, in combination, side chains, cross chains, intermediate treads between the cross chains having extensions on their ends to reduce the wear of the cross chains on the tire.

5. A non-skid tire protector having in combination side chains, and treads of yielding flexible material secured to the side chains and being provided with reinforced edges, and means for connecting the treads to the side chains holding the edges of the treads off the surface of the tire.

6. A non-skid tire protector having, in combination, side chains, cross members, and attaching devices for securing the latter to the former, the side chains being provided with wear-protecting sleeves on the links which are engaged by the attaching means to the cross members.

LINCOLN C. CUMMINGS.